United States Patent [19]
Kapaan et al.

[11] Patent Number: 5,667,313
[45] Date of Patent: Sep. 16, 1997

[54] BEARING ASSEMBLY FOR A VEHICLE HUB

[75] Inventors: Hendrikus Jan Kapaan, Nieuwegein, Netherlands; Robert Santry Aman, Seoul, Rep. of Korea; Alexander Jan Carel De Vries, Tiel, Netherlands

[73] Assignee: SKF Industrial Trading and Development Company B.V., Nieuwegein, Netherlands

[21] Appl. No.: 490,179

[22] Filed: Jun. 14, 1995

[30] Foreign Application Priority Data

Jun. 14, 1994 [NL] Netherlands ............................ 9400971

[51] Int. Cl.⁶ ............................ F16C 33/58; F16C 19/38
[52] U.S. Cl. ............................ 384/544; 384/504; 384/559
[58] Field of Search .................... 384/504, 505, 384/506, 510, 512, 517, 537, 543, 544, 559, 560, 563, 569, 571, 584, 585, 586, 589

[56] References Cited

U.S. PATENT DOCUMENTS

| | | | |
|---|---|---|---|
| 1,375,112 | 4/1921 | Searles | 384/504 |
| 1,399,959 | 12/1921 | Hanson | 384/517 |
| 1,420,497 | 6/1922 | Page. | |
| 3,425,760 | 2/1969 | Gordon | 384/563 |
| 3,986,754 | 10/1976 | Torrant | 384/512 X |

FOREIGN PATENT DOCUMENTS

| | | |
|---|---|---|
| 0 126 607 | 11/1984 | European Pat. Off. . |
| 0 317 423 | 5/1989 | European Pat. Off. . |
| 543010 | 8/1922 | France . |
| 547858 | 12/1922 | France . |
| 1049681 | 12/1953 | France ........................ 384/512 |
| 1054128 | 2/1954 | France . |
| 2103756 | 4/1972 | France . |
| 838 237 | 5/1952 | Germany . |
| 6988 | of 1910 | United Kingdom . |
| 1 392 714 | 4/1975 | United Kingdom . |
| 2 112 500 | 7/1983 | United Kingdom . |
| WO81/01817 | 7/1981 | WIPO . |

Primary Examiner—Thomas R. Hannon
Attorney, Agent, or Firm—Young & Thompson

[57] ABSTRACT

Bearing assembly for a vehicle hub comprising two coaxial rolling bearings having inner races and outer races, the outer races being accommodated in a common outer bush, which outer bush is provided with a flange and hub for fixing a vehicle component thereto, the inner races being accommodated on a common central element, the rolling bearings being supported on the central element and the outer bush under initial load in the axial direction.

27 Claims, 6 Drawing Sheets

BEARING ASSEMBLY FOR A VEHICLE HUB

The invention relates to the field of wheel bearings for vehicles, such as heavy road or cross-country vehicles, trailers and railway vehicles. In the case of such vehicles two coaxial bearings are used in the wheel hub. Types of bearings which can be placed under a certain initial load, such as tapered bearings, are often used for this purpose. However, other types of bearings are also used, for example a combination of a ball bearing and a roller bearing.

When the vehicle axle is being assembled, these bearings must be fitted in their intended position on the axle and/or the suspension frame of the wheel. This operation must be carried out with the necessary care, since any damage or penetrating dirt can considerably shorten the service life of the bearings. However, the environment in which such operations are carried out is not always optimal, with the result that the necessary quality cannot be guaranteed. Besides, a degree of specialization is required—certainly if initial tension is used—which manufacturers do have, but which the vehicle producer or the maintenance workshop do not always have.

There is therefore a need for a bearing which is more satisfactory in this respect.

To this end, the invention relates to a bearing assembly for a vehicle hub, comprising two coaxial rolling bearings whose inner races and whose outer races are interconnected, which interconnected outer races are provided with means for fixing a wheel thereto, or with means for fixing said outer bush to the suspension frame of a vehicle wheel.

The bearing assembly according to the invention forms a unit which can be fitted directly in its entirety on an axle and/or suspension frame of a vehicle. It is not necessary in this case to fit all components separately on the axle. Moreover, the bearing assembly can be provided with seals, with the result that it is impossible for dirt to penetrate and the lubricant is retained in the bearing assembly.

The bearing assembly according to the invention can be carried out in various ways. According to a first variant, the outer races are accomodated in a common outer bush, which outer bush is provided with means for fixing a wheel thereto, or with means for fixing said outer bush to the suspension frame of a vehicle wheel. Moreover, also the inner races are accomodated on a common central element.

The rolling bearings can be supported on the central element and the outer bush under initial load in the axial direction. This initial load is applied in advance when the bearing assembly is being assembled, so that these precision operations also need no longer be carried out when the assembly is being fitted on the axle. It is thus possible to guaranteed the correct setting of the initial load.

The stops required for applying and maintaining the initial load can be produced in various ways. According to a first possibility, the outer bush can have a radially inward flanged region whose parts facing away from each other in the axial direction form stop faces for the outer races of the rolling bearings.

However, as an alternative, a supporting ring can also be provided in the outer bush, which supporting ring has stop faces for the outer races of the rolling bearings. Said supporting ring can be fixed in the outer bush by means of pins or bolts situated in holes provided radially in the supporting ring and in the outer bush. High-energy welding can also be used for the fixing. With a suitable choice of the materials for the supporting ring, the initial tension can also be retained when there is thermal expansion.

The central element can be designed in various ways, depending on the use of the bearing assembly. For example, the inner races of the rolling bearings can be accommodated on an inner bush. Said inner bush can have at its opposite ends stops for each of the inner races of the rolling bearings, in order to keep the rolling bearings pressed under initial tension in the axial direction, and possibly in order to absorb and pass on axial forces.

These stops can be formed by supporting rings provided at the opposite ends of the inner bush. These supporting rings are preferably welded onto the inner bush by means of a high-energy beam such as a laser beam. However, as an alternative, another connection method can be used, for example screw thread.

Instead of separate supporting rings, the ends of the inner bush can have radially outward flanged regions whose parts facing each other in the axial direction form stop faces for the inner races of the rolling bearings.

According to a further possibility, the inner bush consists of two inner bush halves, which at their ends facing away from each other are each flanged radially outwards. These inner bush halves are preferably welded to each other when the bearing assembly is being assembled, for example by friction welding or laser welding.

As an alternative, the inner bush halves can have at their ends facing each other radially outward flanged regions, which regions engage in an inner peripheral grooves of a fixing ring.

The inner races of the rolling bearings can be accommodated on a shaft instead of on an inner bush. Said shaft can be a drive shaft which is rotatably supported by the bearings in a fixed housing such as that used in the case of differential drives in motor vehicles, as in the case of lorries.

For purposes of manufacturing such a bearing assembly, the shaft can consist of two shaft parts which are fixed to each other at their ends facing each other, and at their ends facing away from each other bear stops for the inner faces of the rolling bearings, for the purpose of keeping the rolling bearings pressed under axial initial tension.

Said shaft parts can be fixed to each other by a screw connection; the shaft parts can also be fixed to each other by means of a high-energy beam, such as a laser beam, in which case a smooth centering shaft is used instead of a screw thread.

The bearing assembly according to the invention furthermore can be carried out according to a second variant, in which the outer races form a common outer annulus. Moreover the inner races may form a common inner annulus.

The invention also relates to a hub assembly for a vehicle, comprising a bearing assembly of the type described above, in which the outer bush has a radially outward pointing flange which is fixed to the wheel hub, drum or disc brake.

The flange can have holes, through which bolts run, the shank of which bolts is screwed in each case into a threaded axial hole in the wheel hub, drum or disc brake.

The inner bush can be fixed to a shaft which has a shoulder against which the inner bush is clamped by beams of a clamping ring disposed on the shaft. If said shaft is also provided, a drive shaft having a radially outward pointing flange which is fixed to the wheel hub by means of the bolts can run through it.

The bearing assembly may or may not be completed by electrical/electronic control equipment, for determining the number of revolutions and/or the temperatures of the bearing races, for example ABS in motor vehicles and temperature determination for train bearings.

A number of exemplary embodiments of a hub assembly having a bearing assembly according to the invention will be described in greater detail below with reference to the figures.

Figure 1:
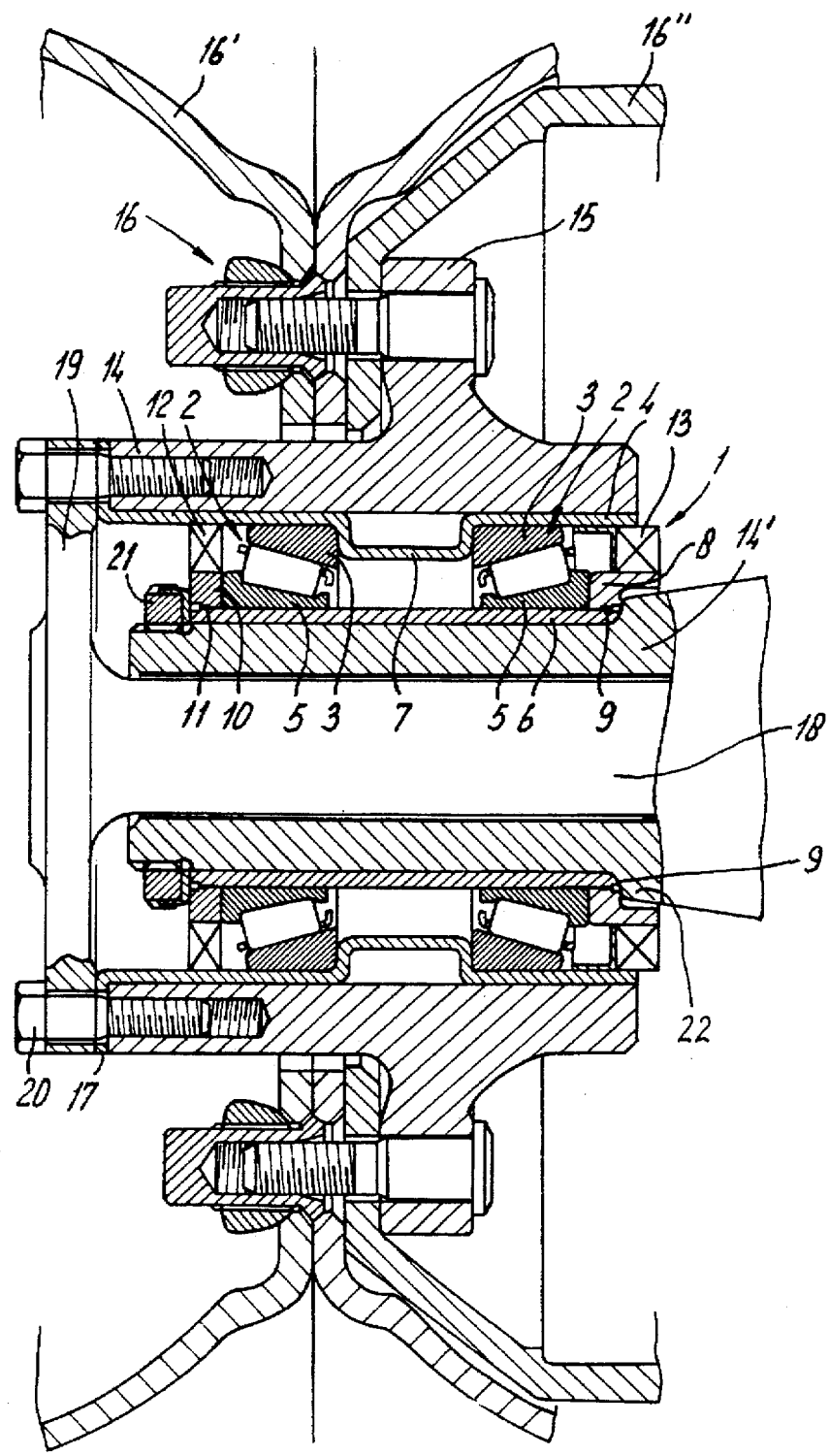
FIG. 1 shows a section through a first hub assembly according to the invention.

The hub assembly shown in FIG. 1 shows a bearing assembly 1 according to the invention. Said bearing assembly 1 is assembled from two tapered bearings 2, an outer bush 4 disposed on the outer races 3 of the tapered bearings 2, and also an inner bush 6 disposed in the inner races 5 of the tapered bearings 2.

The outer bush 4 has an inward flanged region 7 (tubular section) which has stop faces on either side for the outer races 3 of the tapered bearings 2. A supporting ring 8 is welded by means of a laser weld 9 onto the inner bush 6 at one end, and the supporting ring 10 is welded by means of laser weld 11 onto said supporting ring at the other end. When the supporting rings 8, 10 are being fitted, the desired axial initial tension is also applied to the tapered bearings 2. After the supporting rings 8, 10 have been fixed by the laser weld 9, 11, a bearing assembly 1 with the desired axial initial load is obtained as a result.

After the application of the lubricant, the bearing assembly 1 can be sealed off by means of the seals 12, 13 which are known per se and are therefore not described in any further detail.

In the exemplary embodiment illustrated, the inner bush 6 is disposed on a fixed shaft 14'. The outer bush 4 is inserted into the hub 14, which has a flange 15 on which a wheel 16' and a brake drum/brake disc 16 are fixed by means of bolted connections 16.

The outer bush 4 has a radially outward pointing flange 17. Running through the fixed shaft 14' is a drive shaft 18, which also has an outward pointing flange 19. Both flanges 17, 19 are fixed by means of bolts 20 to the hub 14.

The inner bush 6 is pressed against the shoulder 22 of the fixed shaft 14' by means of a threaded ring 21, which is screwed onto the fixed shaft 14'.

Figure 2:
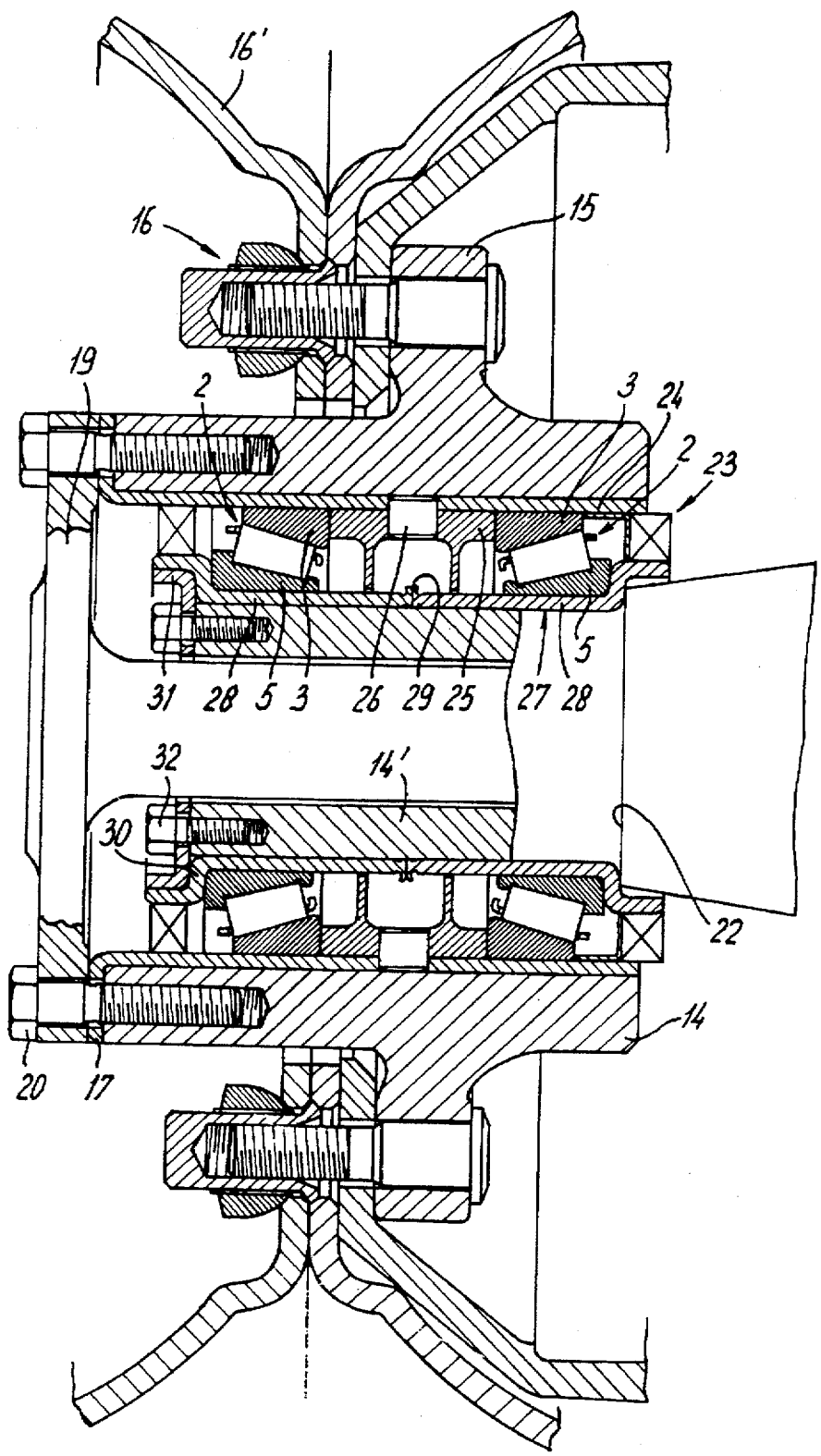
FIG. 2 shows a section through a second hub assembly.

The example shown in FIG. 2 shows a hub assembly with a bearing assembly 23. The outer bush 24 of which contains a supporting ring 25 which is fixed by means of pins 26 to the outer bush 24. The outer races 3 of the tapered bearings 2 rest under initial load against the faces of said supporting ring 25 which face away from each other.

The inner bush indicated in its entirety by 27 consists of the inner bush halves 28, which are fixed to each other by means of friction weld 29. At their ends facing away from each other the inner bush halves 28 have a radially outward flanged region 30, against which the inner races 5 of the tapered bearings 2 rest. The shape of the supporting ring is selected in such a way that welding spatters are collected in an enclosed space, with the result that they cannot penetrate into the bearing.

When the inner bush halves 28 are being welded together, the desired axial initial load can thus be applied in the tapered bearings 2.

The outer bush 24 is again fixed to the hub by means of flange 17; the inner bush is held pressed against the shoulder 22 on the fixed shaft 14' by clamping ring 31, which is fixed in the fixed shaft 14' by means of bolts 32.

Since the bearing will no longer be replaced, the bearing itself can be simplified, for example by leaving out the small end flange of the inner race.

Figure 3:
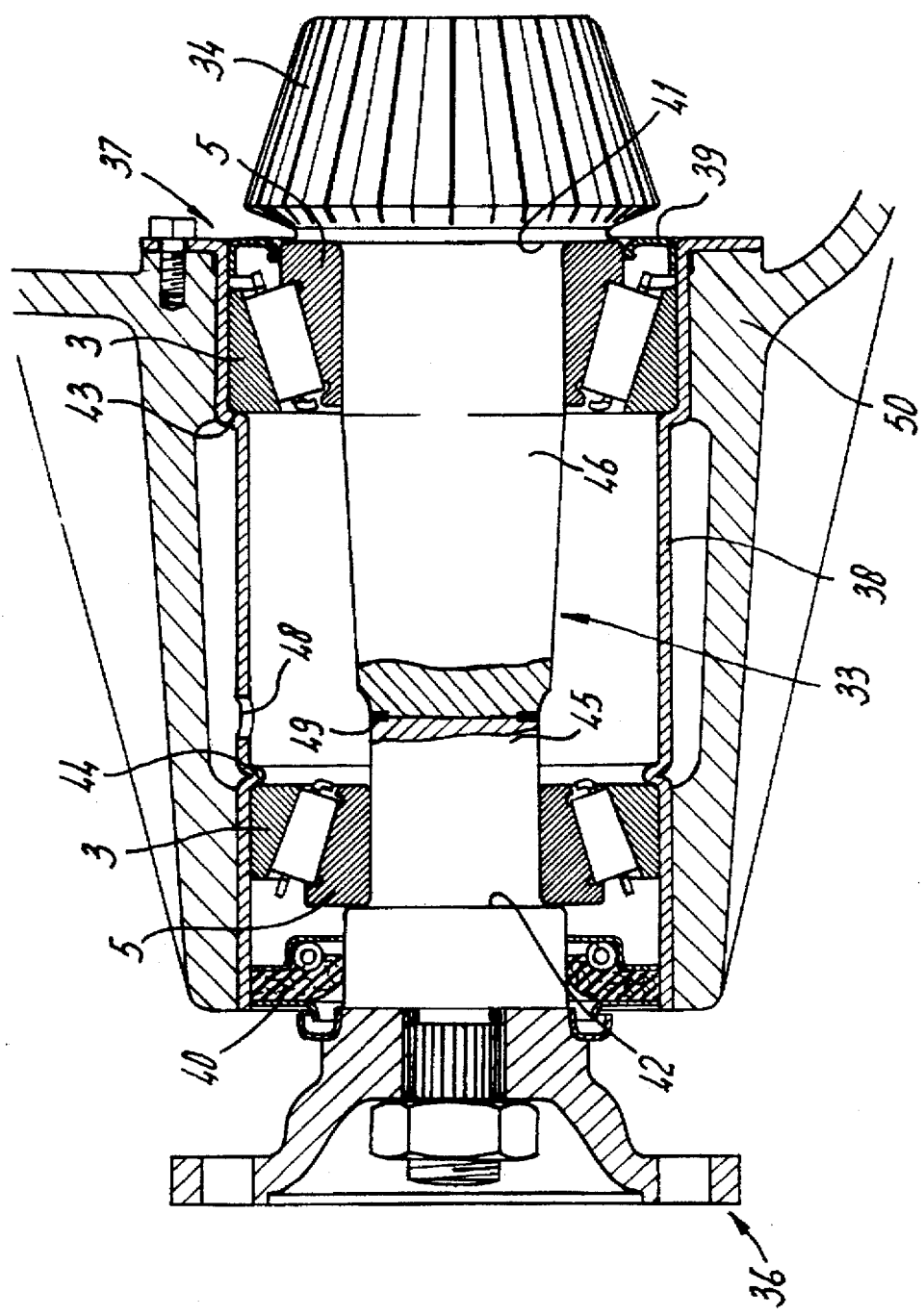
FIG. 3 shows a section through a drive part of a differential drive having a bearing assembly according to the invention.

The exemplary embodiment of a hub assembly shown in FIG. 3 shows a drive shaft—indicated in its entirety by 33—of a differential drive which bears a bevel gear 34 at its one end. Said bevel gear 34 forms part of the bearing assembly. At its other end, the drive shaft 33 bears a coupling flange 36, to which a wheel can be fixed.

The bearing assembly indicated in its entirely by 37 comprises, in addition to the drive shaft 33, an outer bush 38, two tapered bearings 2, and seals 39, 40.

The inner races 5 of the tapered bearings 2 are disposed on the drive shaft 33, and rest against shoulders 41 and 42. The outer races 3 of the tapered bearings 2 rest against the radially inward flanged parts 43, 44 of the outer bush 38.

The drive shaft 33 consists of shaft parts 45, 46, which are fixed to each other by means of welding and/or screwed connection 49. The distances between shoulder 41, shoulder 42 and flanged regions 43, 44 are such that the desired axial initial load in the tapered bearings 2 is obtained when the shaft halves 45, 46, are connected to each other. Therefore, after the drive shaft 33 has been assembled, a weld 49 is made between the shaft parts 45 and 46 by means of a high-energy beam, for example a laser beam, through hole 48 in the outer bush 38.

The outer bush 38 is fixed in the housing 50 of a differential housing.

Figure 4:
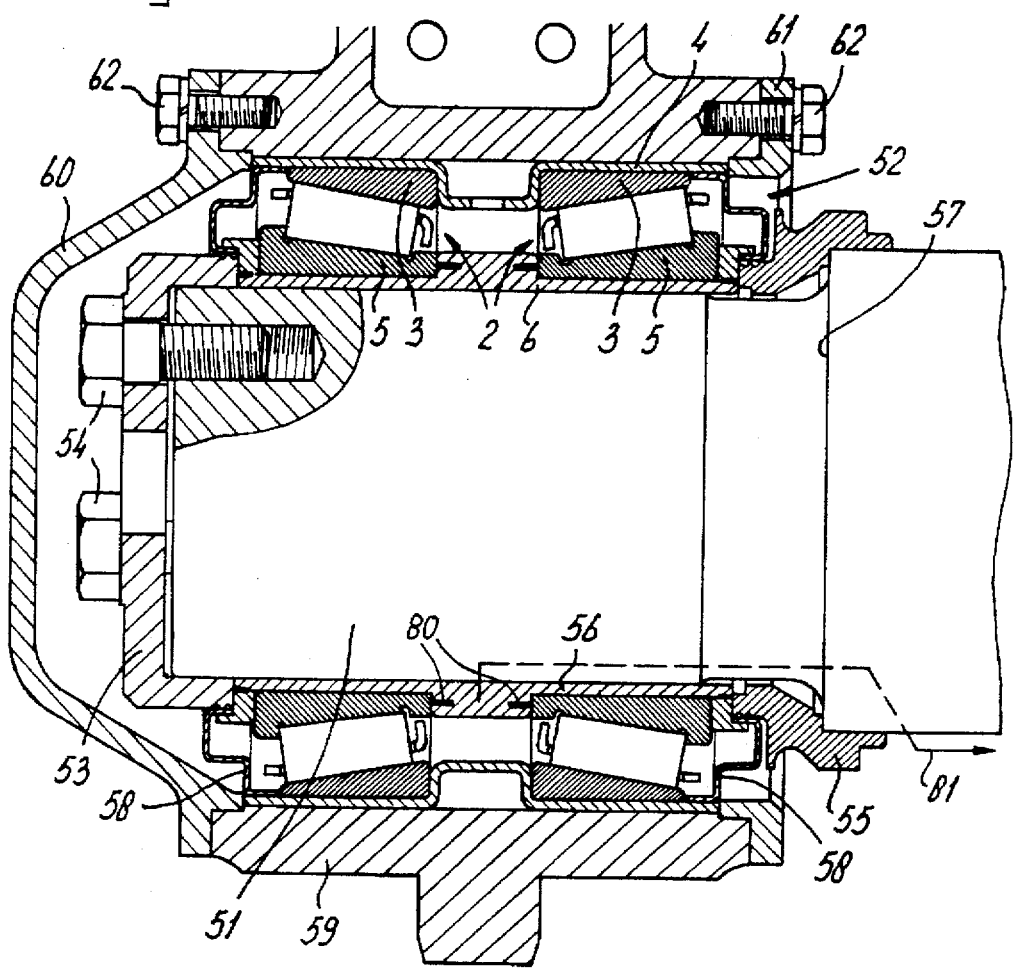
FIG. 4 shows a fourth embodiment of a hub assembly.

The exemplary embodiment shown in FIG. 4 relates to a hub assembly for a railway bearing. The bearing assembly, indicated in its entirety by 52, is fixed on the shaft end 51 by means of clamping ring 53. Said clamping ring 53 is screwed into the shaft end 51 by means of bolts 54. By means of supporting ring 55, the inner bush 56 being pressed by the clamping ring 53 rests against the shoulder 57. For the rest, the design of the bearing assembly 52 largely corresponds to the bearing assembly 1 shown in FIG. 1. Only the radially outward pointing flange of the outer bush 4 is not present here. The desired sealing of the bearing assembly 52 is ensured by means of the seal 58.

The outer bush 4 of the bearing assembly 52 is fixed in the bearing housing 59 by means of the cap 60 and the supporting ring 61. The latter are fixed to the opposite ends of the hub 59 by means of bolts 62, in such a way that the outer bush 4 can be retained in a confined manner between them. The bearing temperature can be monitored by means of temperature sensor 80. Said sensors 80 are connect to signal lines 81, which are connected to recording and/or warning elements (not shown).

Figure 5:
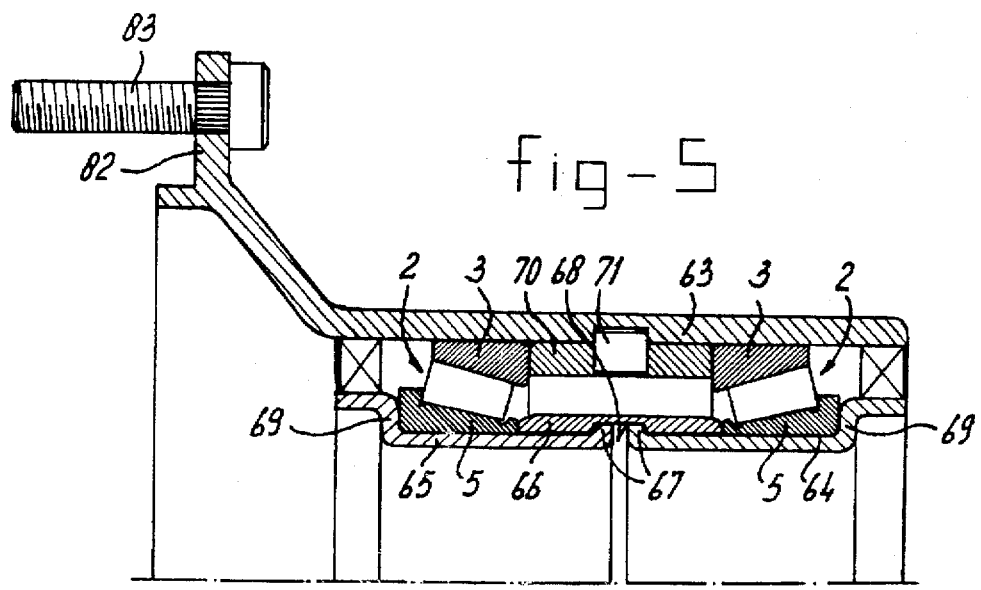
FIG. 5 shows a partial section through a bearing assembly for a railway vehicle.

The bearing assembly for a lorry shown in FIG. 5, with flanges 82 and bolts 83 for the fitting of a wheel, brake drum and/or brake disc, comprises an outer bush 63 and an inner bush formed from the halves 64, 65, which are fixed to each other by connecting ring 66. The inner bush halves have radially outward flanged edges 67, which fit into the groove 68 of fixing ring 66 and place the bearing assembly under initial tension. Both inner bush halves 64, 65 also have a radially outward flanged region 69, against which the inner races 5 of the tapered bearings 2 rest.

The outer races 3 of said tapered bearings 2 are also supported against the supporting ring 70, which is fixed in the outer race 63 by means of headless pins or bolts 71 or by means of high-energy welding.

Figure 6:
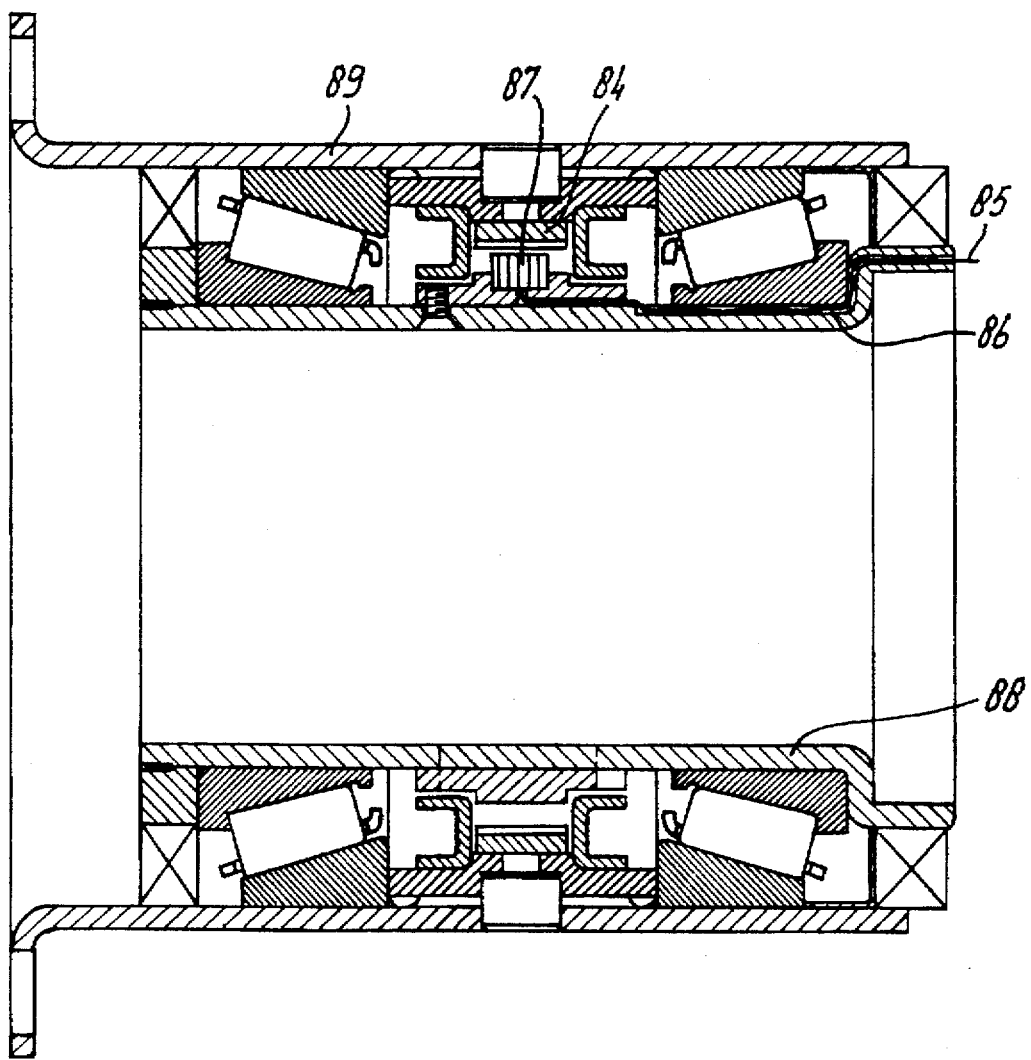
FIG. 6 shows a bearing assembly with ABS mechanism.

In the bearing assembly shown in FIG. 6, an ABS sensor 87 is disposed on the fixed inner bush 88. A counter-ring 84, bearing the usual ribs which can be detected by the ABS sensor 87, is disposed in the rotary outer bush 89. The cable 85 connected to the ABS sensor 87 is guided out of the bearing assembly by way of groove 86 in the inner race.

Figure 7:
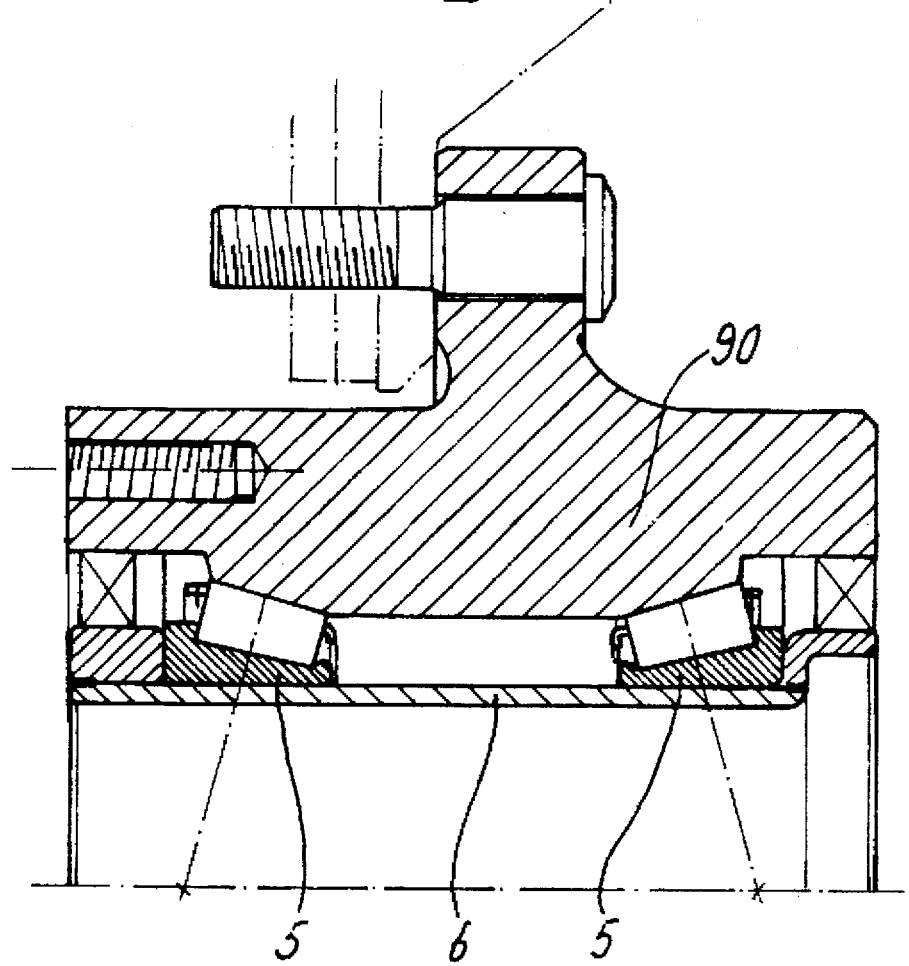
FIG. 7 shows a fifth embodiment of a hub assembly.

The embodiment of FIG. 7 shows a bearing unit having two outer races which together form an outer annulus 90.

The inner races 5 are contained on an inner bush 6, as according to the embodiment of FIG. 1.

Alternatively, the inner races may be carried out as a common inner annulus in which case the outer races are contained in an outer bush.

We claim:

1. Bearing assembly for a vehicle hub, comprising two coaxial rolling bearings (2) having inner races (5) and outer races (3), the outer races (3) being accommodated in a common outer bush (4; 24; 38; 63), which outer bush is provided with means (17, 14) for fixing a vehicle component thereto, the inner races (5) being accommodated on a common central element (6; 27; 33; 56; 64; 65, 66), said rolling bearings (2) being supported on the central element (6; 27; 33; 56; 64, 65, 66) and the outer bush (4; 24; 38; 63) under initial load in the axial direction.

2. Bearing assembly according to claim 1, in which the outer bush (4; 24; 38; 63) has a stop (7; 25; 44, 43; 63) for each of the outer races (3) of the rolling bearings (2), for keeping the rolling bearings (2) pressed in the axial direction under initial load.

3. Bearing assembly according to claim 2, in which the outer bush (4) has a radially inward flanged region (7) whose parts facing away from each other in the axial direction form stop faces for the outer races (3) of the rolling bearings (2).

4. Bearing assembly according to claim 2, in which a supporting ring (25) is provided in the outer bush (24), which supporting ring has stop faces for the outer races (3) of the rolling bearings (2).

5. Bearing assembly according to claim 4, in which the supporting ring (25) is fixed in the outer bush (24) by means of pins or bolts (26) situated in holes provided radially in the supporting ring (25) and in the outer bush (24).

6. Bearing assembly according to claim 1, in which the inner races (5) of the rolling bearings (2) are accommodated on an inner bush (6; 27; 56; 64; 65, 66).

7. Bearing assembly according to claim 6, in which the inner bush (6; 27; 56; 64, 65, 66) has at its opposite ends stops (8, 10; 30; 41; 42; 68, 69) for each of the inner races (5) of the rolling bearings (2), in order to keep the rolling bearings (2) pressed under initial tension in the axial direction.

8. Bearing assembly according to claim 7, in which the inner bush (6) has supporting rings (8, 10) at its opposite ends.

9. Bearing assembly according to claim 8, in which the supporting rings (8, 10) are welded onto the inner bush (6) by means of a high-energy beam.

10. Bearing assembly according to claim 7, in which the ends of the inner bush (27; 64, 65, 66) have radially outward flanged regions (30; 68, 69) whose parts facing each other in the axial direction form stop faces for the inner races (3) of the rolling bearings (2).

11. Bearing assembly according to claim 10, in which the inner bush (27; 64, 65, 66) consists of two inner bush halves (28; 64; 65), which at their ends facing away from each other are flanged radially outwards.

12. Bearing assembly according to claim 11, in which the inner bush halves (28) are fixed to each other by welds (29).

13. Bearing assembly according to claim 11, in which the inner bush halves (64, 65) have at their ends facing each other radially outward flanged regions (67), which regions engage in an inner peripheral groove (68) of a fixing ring (66).

14. Bearing assembly according to claim 1, in which the inner races (5) of the rolling bearings (2) are accommodated on a shaft (33).

15. Bearing assembly according to claim 14, in which the shaft (33) consists of two shaft parts (45, 46) which are fixed to each other at their ends facing each other, and at their ends facing away from each other bear stops (42, 43) for the inner races (5) of the rolling bearings, for the purpose of keeping the rolling bearings (2) pressed under axial initial tension.

16. Bearing assembly according to claim 15, in which the shaft parts (45, 46) are fixed to each other by a screwed connection (47).

17. Bearing assembly according to claim 16, in which the shaft parts (45, 46) are fixed (49) to each other by means of a high-energy beam.

18. Bearing assembly according to claim 1, in which at least one seal (13; 40; 58) is provided between the outer bush (4; 24; 38; 63) and the central element (6; 27; 33; 56; 64, 65, 66).

19. Bearing assembly according to claim 18, in which a seal is provided at both ends of the bearing assembly.

20. Bearing assembly according to claim 1, in which the outer races form a common outer annulus.

21. Bearing assembly according to claim 1, in which the inner races form a common inner annulus.

22. Bearing assembly according to claim 1, in which the outer bush (4; 24) has a radially outward pointing flange (17) for fixing thereto the vehicle component.

23. Bearing assembly according to claim 22, in which the flange (17) is provided with holes, through which holes bolts (20) run, the shank of which bolts in each case is screwed into a threaded axial hole in said vehicle component in the form of a wheel hub (14).

24. Bearing assembly according to claim 23, in which the inner bush (6; 28; 56) is fixed on a shaft (14'), which shaft (14') has a shoulder (13', 22) against which the inner bush (6; 28) is clamped by means of a clamping ring (21; 31) disposed on the shaft.

25. Bearing assembly according to claim 24, in which the shaft (14') is hollow, through which hollow shaft (14') a drive shaft (18) runs, which drive shaft has a radially outward pointing flange (19) which is fixed to the wheel hub (14) by means of the bolts (20).

26. Bearing assembly according to claim 22, in which an ABS sensor and/or temperature sensor is provided.

27. Bearing assembly according to claim 26, in which a groove is provided in said fixing means, for the accommodation of signal cables.

* * * * *